United States Patent
Hsu et al.

(10) Patent No.: US 10,028,488 B2
(45) Date of Patent: Jul. 24, 2018

(54) INTERACTIVE DEVICE FOR ANIMALS

(71) Applicant: Tomofun Co., Ltd., Taipei (TW)

(72) Inventors: Hsueh-Far Hsu, New Taipei (TW);
Chih-Hsin Tseng, New Taipei (TW);
Hsien-Ching Wei, New Taipei (TW);
Yo Chen Victor Chang, Taipei (TW);
Kong-Che Luo, New Taipei (TW)

(73) Assignee: TOMOFUN CO., LTD., Taipei (TW)

( * ) Notice: Subject to any disclaimer, the term of this patent is extended or adjusted under 35 U.S.C. 154(b) by 244 days.

(21) Appl. No.: 14/997,007

(22) Filed: Jan. 15, 2016

(65) Prior Publication Data

US 2016/0227741 A1 Aug. 11, 2016

(30) Foreign Application Priority Data

Feb. 10, 2015 (TW) .............................. 104202129 U

(51) Int. Cl.
*A01K 15/02* (2006.01)
(52) U.S. Cl.
CPC .................................. *A01K 15/027* (2013.01)
(58) Field of Classification Search
CPC ...... A01K 15/02; A01K 15/021; A01K 15/027
USPC ........................................................ 119/707
See application file for complete search history.

(56) References Cited

U.S. PATENT DOCUMENTS

| | | | | |
|---|---|---|---|---|
| 563,807 A * | 7/1896 | Rudolph | ............... | F41B 7/00 124/16 |
| 3,640,263 A * | 2/1972 | Rhodes | ............... | A63B 69/409 124/32 |
| 4,185,824 A * | 1/1980 | Natwick | ............... | A63F 9/02 124/53.5 |
| 4,267,799 A * | 5/1981 | Bacon | ............... | A01K 5/0275 119/61.2 |
| 4,579,100 A * | 4/1986 | Whitaker | ............... | A63B 69/407 124/26 |
| 4,611,571 A * | 9/1986 | Tressler | ............... | A63B 69/408 124/7 |
| 4,834,060 A * | 5/1989 | Greene | ............... | A63B 69/406 124/78 |
| 4,995,374 A * | 2/1991 | Black | ............... | A01K 15/025 124/32 |
| 5,107,820 A * | 4/1992 | Salansky | ............... | A63B 69/40 124/48 |

(Continued)

*Primary Examiner* — Monica L Williams
*Assistant Examiner* — Brady W Frazier
(74) *Attorney, Agent, or Firm* — McClure, Qualey & Rodack, LLP

(57) ABSTRACT

An interactive device for animals is provided, including a main body, a circuit module, a video/audio transceiver, a driving module, a first pusher, and a first communicating member, wherein the circuit module, the video/audio transceiver, and the driving module are disposed on the main body, and the video/audio transceiver and the driving module are electrically connected to the circuit module. The main body has a recess and an opening. The first pusher is movably disposed in the recess and connected to the driving module. The first communicating member communicates the recess with the opening. When the driving module drives the first pusher to protrude from an inner wall of the recess, the first pusher pushes an object in the recess into the first communicating member, and the object leaves the main body through the opening.

8 Claims, 12 Drawing Sheets

(56) References Cited

U.S. PATENT DOCUMENTS

| | | | | |
|---|---|---|---|---|
| 7,263,953 | B2* | 9/2007 | Sundararajan | A01K 5/0275 |
| | | | | 119/496 |
| 7,703,447 | B2* | 4/2010 | Caveza | A01K 15/026 |
| | | | | 119/51.01 |
| 8,944,006 | B2* | 2/2015 | Anderson | A01K 5/01 |
| | | | | 119/51.01 |
| 9,301,503 | B1* | 4/2016 | Arrighi | A01K 15/025 |
| 9,339,716 | B1* | 5/2016 | Ward | A63B 69/407 |
| 2007/0113792 | A1* | 5/2007 | Van Den Berg | A01K 5/0275 |
| | | | | 119/56.1 |
| 2011/0303208 | A1* | 12/2011 | Taylor | A01K 15/02 |
| | | | | 124/54 |
| 2013/0228138 | A1* | 9/2013 | Hamill | A01K 15/025 |
| | | | | 119/707 |
| 2013/0319338 | A1* | 12/2013 | Davis | A01K 5/0114 |
| | | | | 119/57.1 |

* cited by examiner

INTERACTIVE DEVICE FOR ANIMALS

CROSS REFERENCE TO RELATED APPLICATIONS

The present application is based on, and claims priority from, Taiwan Patent Application No. 104202129, filed on Feb. 10, 2015, the disclosure of which is hereby incorporated by reference herein in its entirety.

BACKGROUND OF THE INVENTION

Field of the Invention

The application relates in general to an interactive device for animals, and in particular, to an interactive device for animals used for throwing an object.

Description of the Related Art

Lots of people keep pets at home, but it is difficult to monitor the pet's behavior and the pet's physical condition when the pet owner leaves the pet home alone. Thus, some pet owners dispose a photography apparatus at home to observe the pet's behavior.

However, there can be no interaction with the pet when using a conventional photography apparatus, making it hard to attract the pet to approach the photography apparatus. Furthermore, the pet's physical condition may deteriorate from lack of exercise. Therefore, how to interact with the pet when the pet owner cannot stay with the pet has become an important issue.

BRIEF SUMMARY OF INVENTION

To address the deficiencies of conventional electronic products, an embodiment of the invention provides an interactive device for animals, comprising a main body, a circuit module, a video/audio transceiver, a driving module, a first pusher, and a first communicating member, wherein the circuit module, the video/audio transceiver, and the driving module are disposed on the main body, and the video/audio transceiver and the driving module are electrically connected to the circuit module. The main body has a recess and an opening. The first pusher is movably disposed in the recess and connected to the driving module. The first communicating member communicates the recess with the opening. When the driving module drives the first pusher to move along a first direction and protrude from an inner wall of the recess, the first pusher pushes an object in the recess into the first communicating member, and the object leaves the main body through the opening.

In some embodiments, the interactive device for animals further comprises a second communicating member, a second pusher, and an elastic member. The second communicating member communicates the first communicating member and the opening. The second pusher for pushing the object out of the main body through the opening is movably disposed in the second communicating member and connected to the driving module. The elastic member is connected to the main body and the second pusher.

In some embodiments, the interactive device for animals further comprises a first communicating port, formed between the first communicating member and the second communication member, wherein the first communicating port is not covered by the second pusher.

In some embodiments, the interactive device for animals further comprises a motor, a gear assembly connected to the motor, and an intermittent gear connected to the gear assembly. The first pusher and the second pusher respectively comprise a gear rack. When the motor drives the gear assembly and the intermittent gear to rotate, the intermittent gear intermittently and repeatedly engages with the first pusher and the second pusher.

In some embodiments, the circuit module comprises a detecting unit for detecting the loading of the driving module. When the detecting unit detects that the driving module is in a low-loading state, the driving module stops driving the gear assembly.

In some embodiments, the circuit module comprises a detecting unit for detecting the loading of the driving module. When the detecting unit detects that the driving module is in a high-loading state, the driving module drives the first pusher to move along a second direction, wherein the second direction is opposite to the first direction.

In some embodiments, the interactive device for animals further comprises a stirring plate, disposed in the recess and connected to the driving module, wherein the stirring plate is rotatable relative to the main body.

In some embodiments, a longitudinal slot is formed on an inner surface of the recess, and the driving module drives the first pusher to move along the longitudinal slot and protrude from the inner wall of the recess.

In some embodiments, the interactive device for animals further comprises a sealer, and a second communicating port is formed between the recess and the first communicating member, wherein the sealer is pivotally connected to the driving module for sealing the second communicating port.

In some embodiments, the video/audio transceiver comprises camera, microphone, LED or speaker.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the interactive device for animals is discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
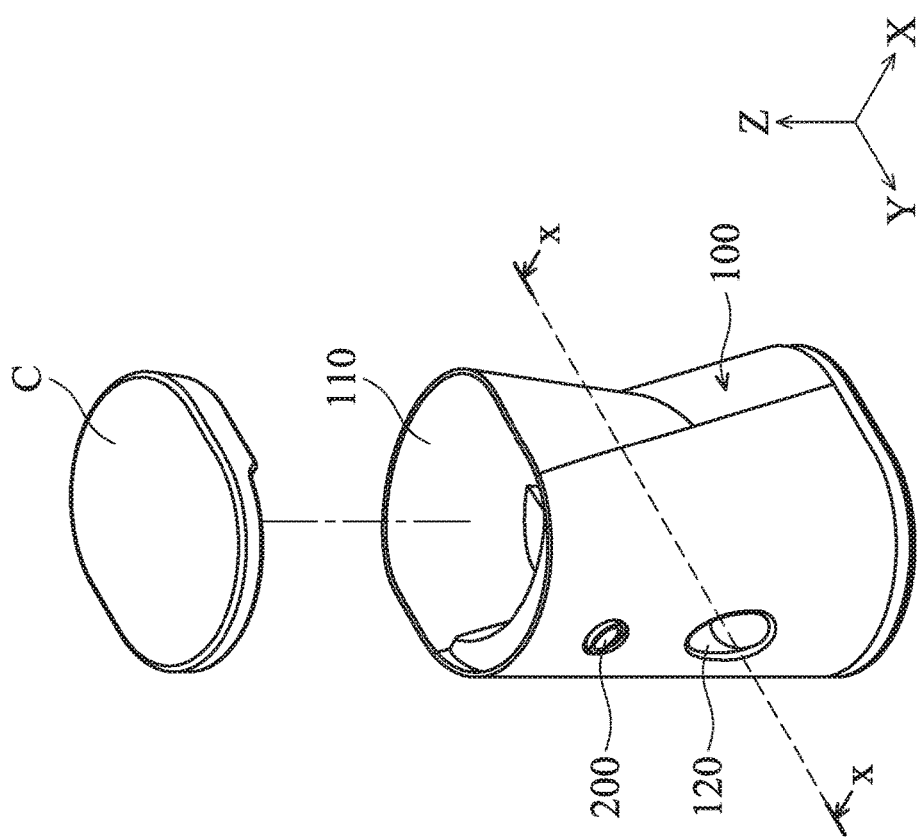
FIG. 1 is a schematic diagram of an interactive device for animals according to an embodiment of the invention.

Referring to FIG. 1, in an embodiment of the invention, a main body 100 of an interactive device for animals has a recess 110 and an opening 120 communicated with the recess 110, and a video/audio transceiver 200 (for example, a wireless web camera having an angle adjustable function) is disposed on the main body 100. The user can put objects used for interacting (such as the pet food or the toy balls) into the recess 110, and the objects can leave the main body 100 through the opening 120. Thus, the user can not only monitor the condition of the animals by receiving or transmitting the video/audio signal from the video/audio transceiver 200, but also throw the object through the opening 120 to interact with the pet.

As shown in FIG. 1, in this embodiment, a cover C detachably seals the recess 110 to prevent the animals from directly picking up the object (the food or the toy) therefrom. The video/audio transceiver 200 and the opening 200 face toward the same side, and the video/audio transceiver 200 comprises a microphone and a camera having a wireless communication function, therefore, the user can easily observe the behavior of the animals by the video/audio transceiver 200. In some embodiments, the video/audio transceiver 200 comprises a light emitting diode (LED) and a speaker, so that the animals can be attracted by the light or the sound of the user, and the interaction between the user and the animals can be improved.

Figure 2:
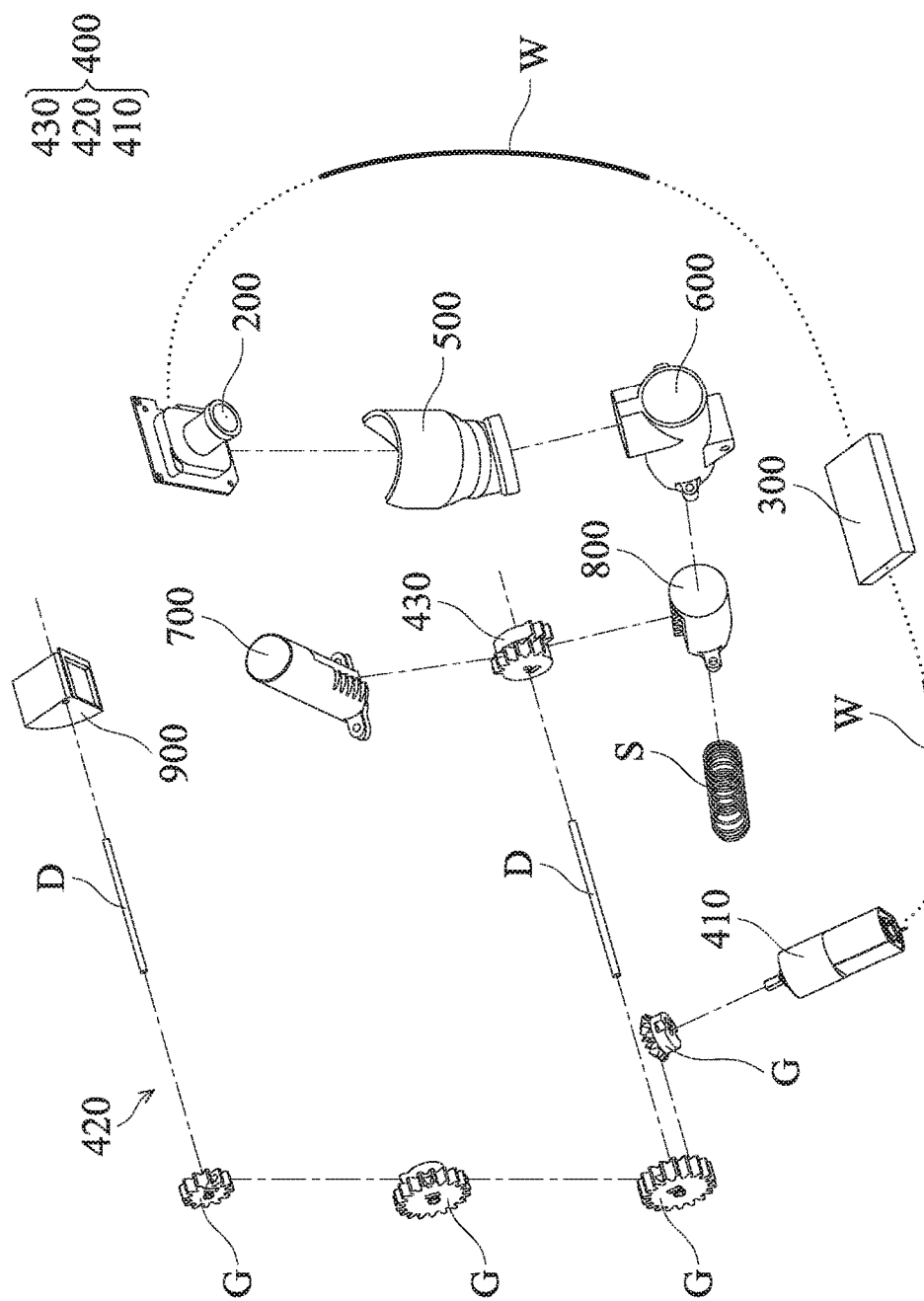
FIG. 2 is an exploded-view diagram of the interactive device for animals in FIG. 1 without a main body and a cover.

Referring to FIG. 2, a circuit module 300, a driving module 400, a first communicating member 500, a second communicating member 600, a first pusher 700, a second pusher 800, a stirring plate 900, and an elastic member S are disposed in the main body 100 of the interactive device for animals, wherein the circuit module 300 is electrically connected to the driving module 400 and the video/audio transceiver 200 through respective wires W. In this embodiment, the driving module 400 comprises a motor 410, a gear assembly 420, and an intermittent gear 430. The gear assembly 420 comprises a plurality of gears G and a plurality of driving shafts D, and connects the motor 410, the intermittent gear 430, and the stirring plate 900. It should be noted that the position and the number of gears G and driving shafts D in the gear assembly 420 and the intermittent gear 430 can be adjusted as required, and are not limited to those illustrated in FIG. 2.

Figure 3A:
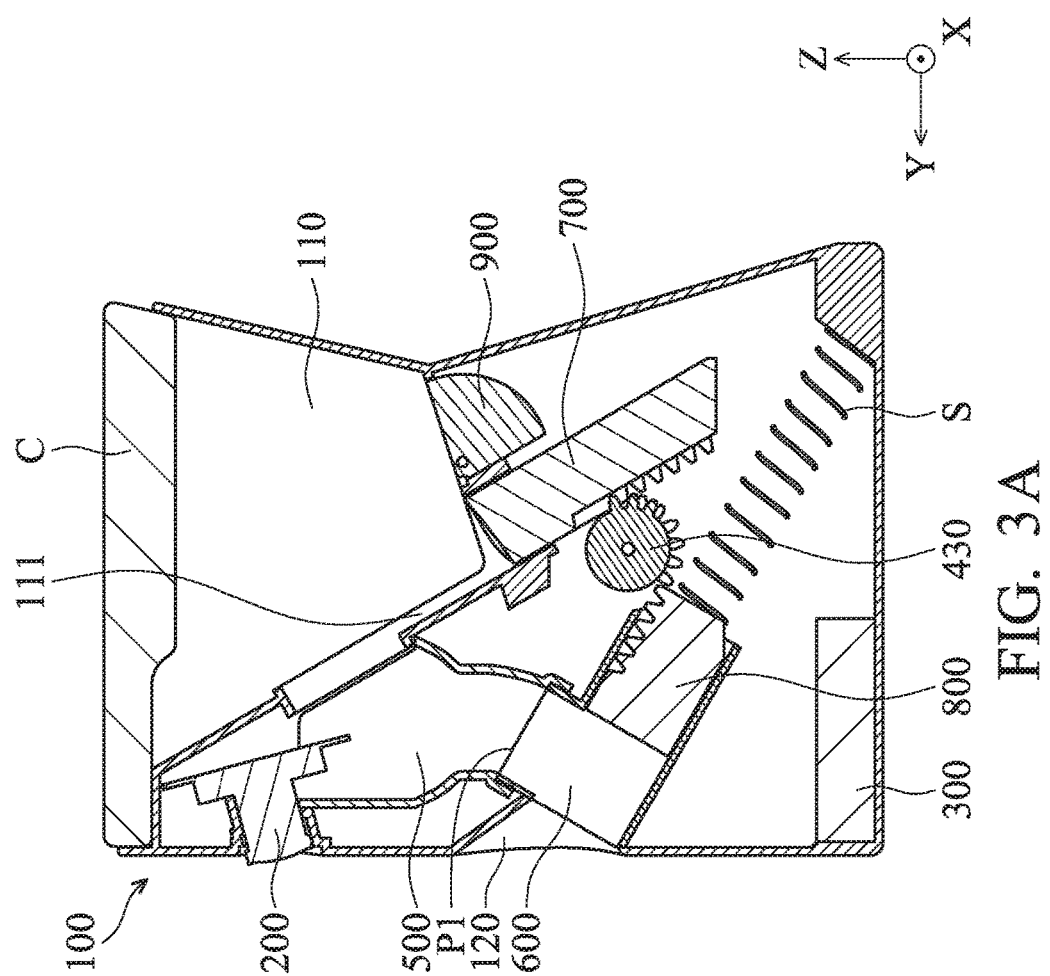
FIG. 3A is a cross-sectional view taken along the line x-x in FIG. 1.

As shown in FIG. 3A, the first pusher 700 and the second pusher 800 respectively comprises a gear rack, and the intermittent gear 430 can rotate in a counterclockwise direction therebetween. Therefore, the intermittent gear 430 can intermittently and repeatedly engage with the first pusher 700 and the second pusher 800, and drive the first pusher 700 and the second pusher 800 to move.

Figure 3B:
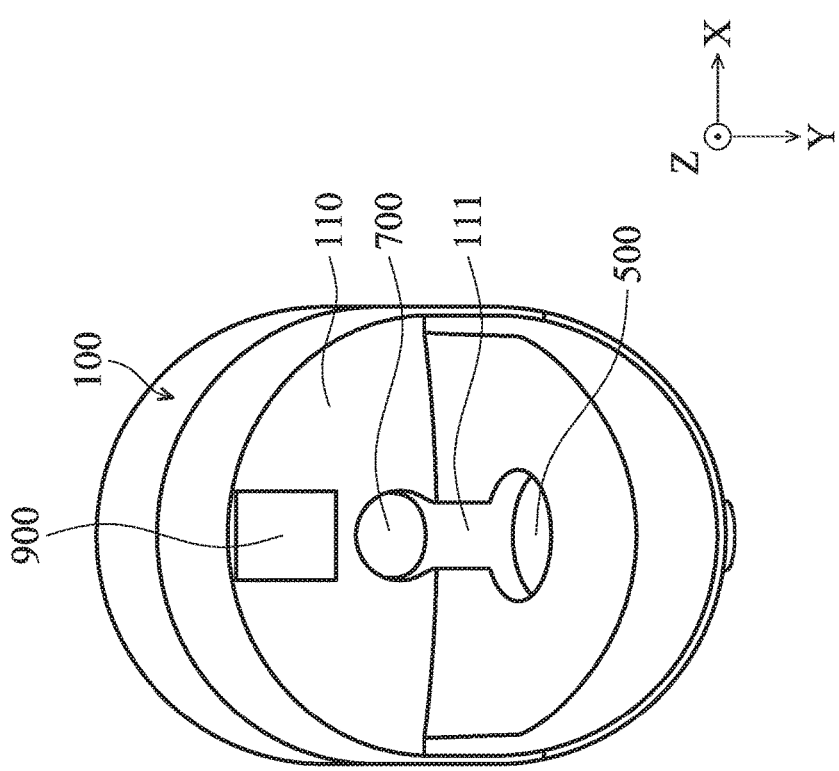
FIG. 3B is a top view of the interactive device for animals in FIG. 1 without a cover.

Referring to FIG. 3A, the opposite sides of the first communicating member 500 are respectively connected to the recess 110 and the second communicating member 600, and the second communicating member 600 is connected to the opening 120 of the main body 100. As shown in FIGS. 3A and 3B, the first pusher 700 is disposed in the recess 110, and can move along a longitudinal guiding slot 111 on an inner surface of the recess 110. The second pusher 800 is movably disposed in the second communicating member 600. Furthermore, the opposite sides of the elastic member S (such as spring) respectively abut the second pusher 800 and the main body 100. The stirring plate 900 is disposed on the bottom side of the recess 110, and is rotatable relative to the main body 100.

Figure 4:
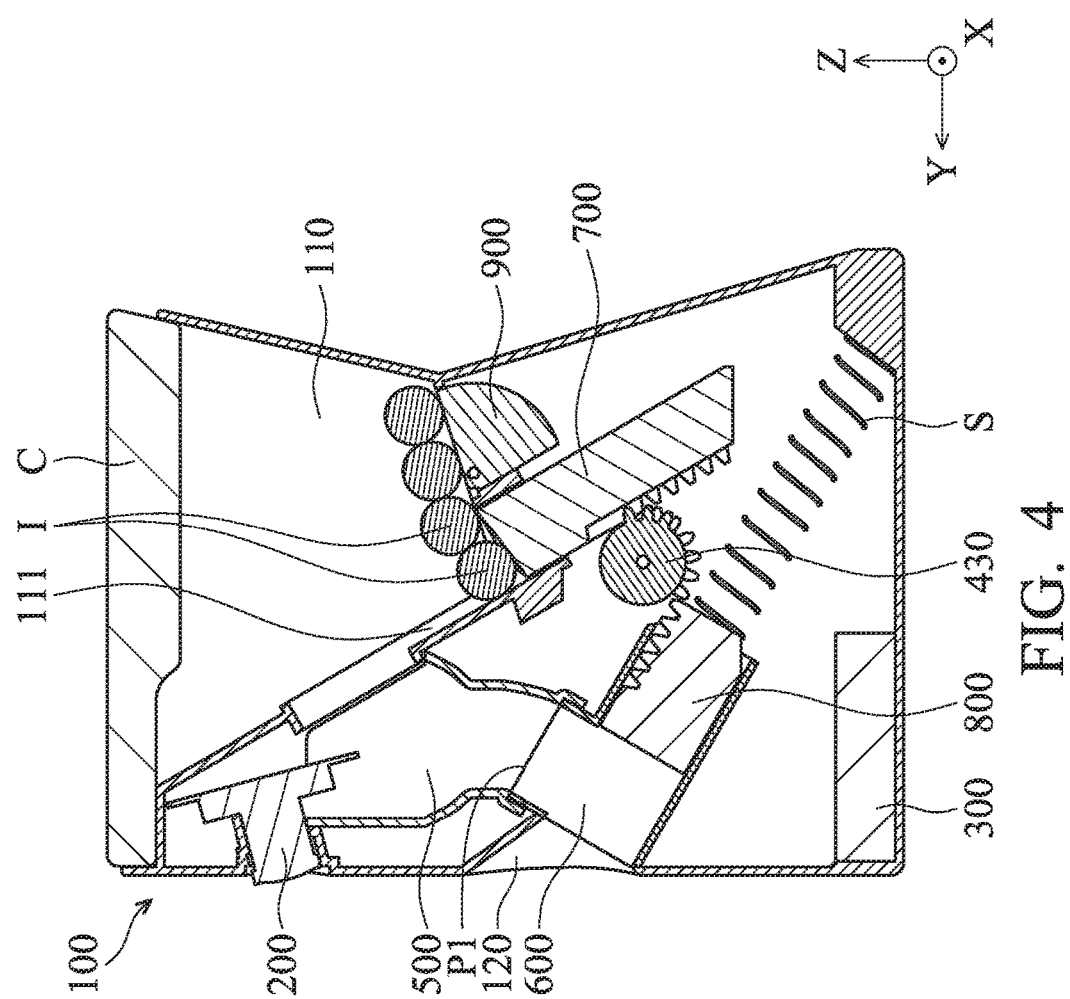
FIG. 4 is schematic diagram representing objects disposed in a recess according to an embodiment of the invention.
Figure 5:
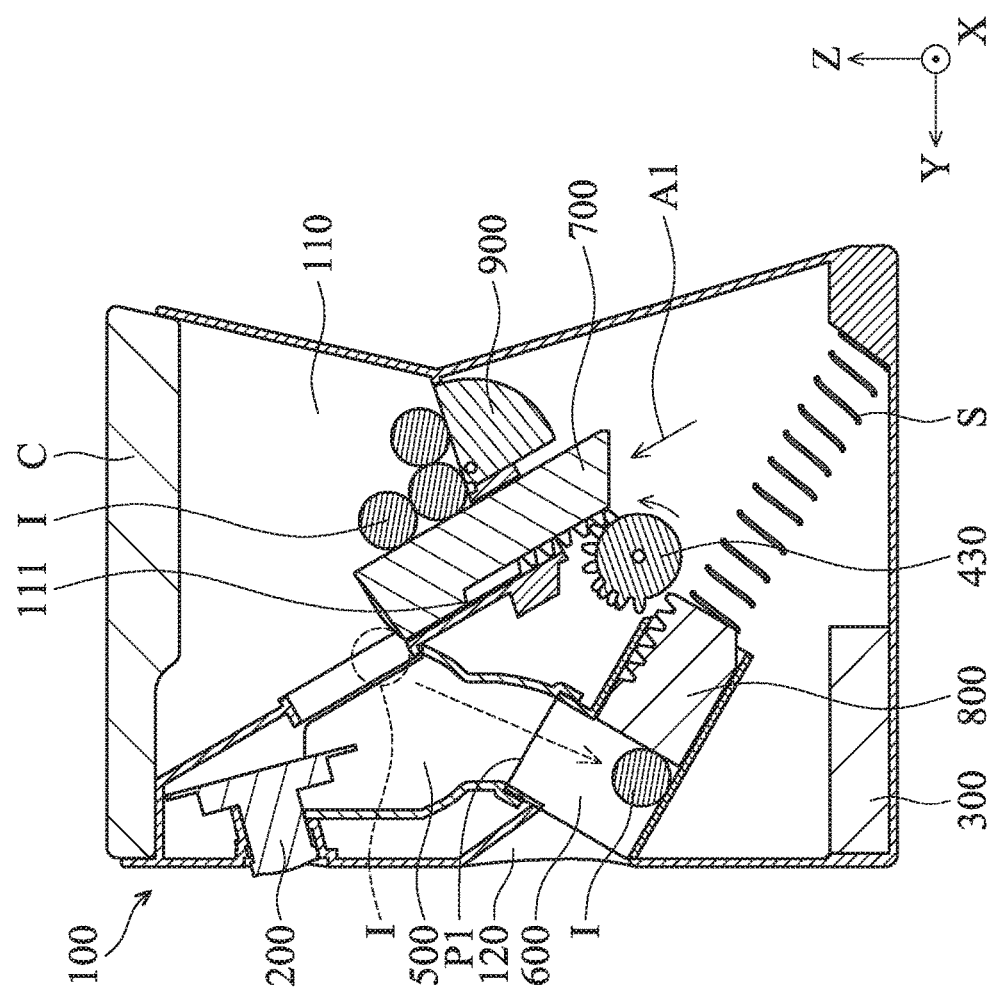
FIG. 5 is a schematic diagram representing a first pusher pushing an object out of the recess according to an embodiment of the invention.

The operation of the interactive device for animals is described below. Referring to the FIGS. 2 and 4, the user can dispose a plurality of objects I in the recess 110 of the main body 100 in advance. Next, as shown in FIG. 2, the user can use an external electronic device to remotely control the circuit module 300. The circuit module 300 transmits a signal to the motor 410 through the wire W to drive the gear assembly 420 rotating, and the gear assembly 420 drives the intermittent gear 430 and the stirring plate 900 to rotate subsequently. As shown in FIG. 5, when the intermittent gear 430 rotates in the counterclockwise direction, it can drive the first pusher 700 moving along the guiding slot 111 in a first direction A1 and protruding from the inner wall of the recess 110. One object I is pushed out from the recess 110 and enters the first communicating member 500, and then drops into the second communicating member 600 through the first communicating member 500.

Figure 6:
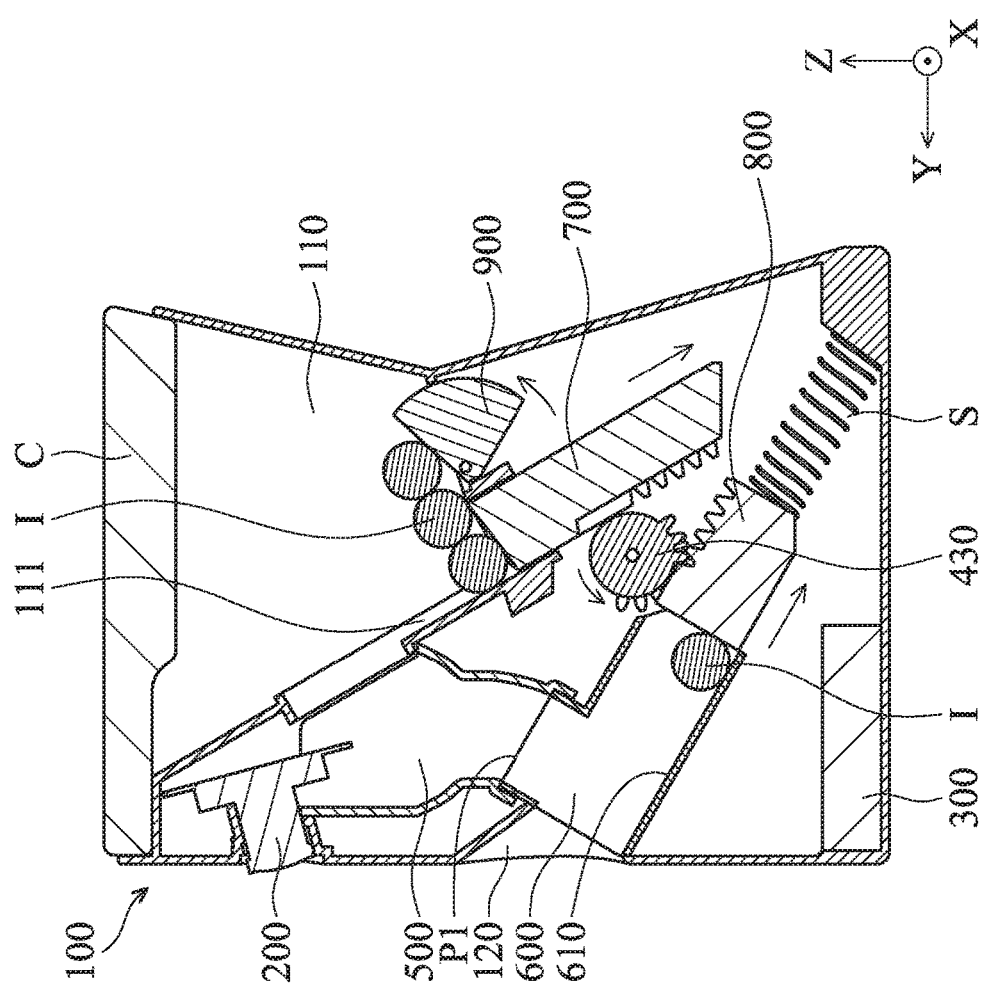
FIG. 6 is a schematic diagram representing a second pusher moving from a first position to a second position according to an embodiment of the invention.

As shown in FIG. 6, when the intermittent gear 430 keeps on rotating in the counterclockwise direction and engages with a second pusher 800, the intermittent gear 430 can drive the second pusher 800 to move from a first position along a bottom-right direction to a second position, compressing the elastic member S, and the object I in the second communicating member 600 slides along an inclined surface 610 and the bottom-right direction. Furthermore, since the first pusher 700 is disengaged from the intermittent gear 430, the first pusher 700 slides down along the guiding slot 111 to the position shown in FIG. 6.

After the first pusher 700 slides down, the stirring plate 900 can be driven by the gear assembly 420 and rotate relative to the main body 100, such that the objects I in the recess 110 can be stirred. Therefore, the objects I can move to the position above the first pusher 700, and interference between the objects I can be prevented.

Figure 7:
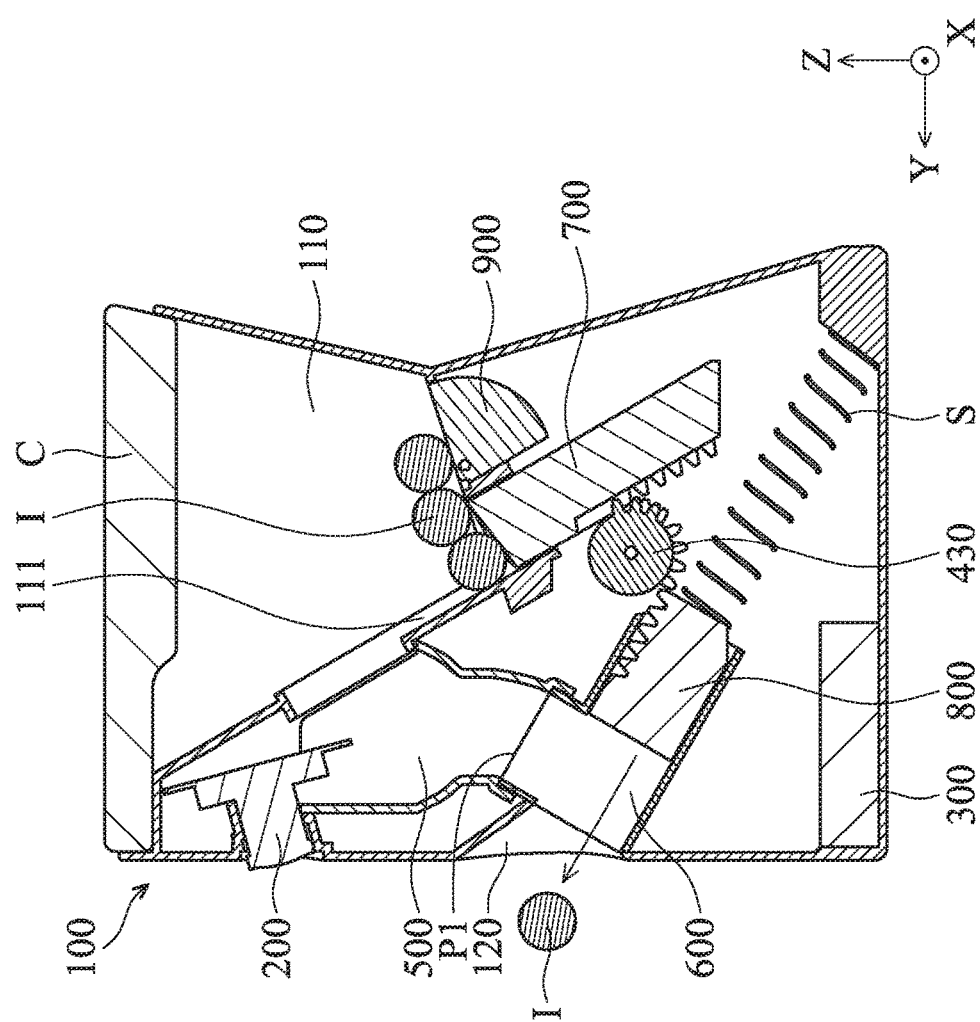
FIG. 7 is a schematic diagram representing an intermittent gear disengaging from the first and second pushers according to an embodiment of the invention.

As shown in FIG. 7, when the intermittent gear 430 keeps on rotating and is separated from the second pusher 800, the elastic member S provides an elastic force to push the second pusher 800 from the second position to the first position, and the object I is thrown out. The object I can leave the main body 100 through the opening 120.

Specifically, the circuit module 300 comprises a detecting unit (not shown). When the detecting unit detects that the motor 410 is in a low-loading state, the circuit module 300 transmits a signal to the motor 410 and the motor 410 stops operating. That is, as shown in FIG. 7, when the intermittent gear 430 rotates in the counterclockwise direction to a position disengaged from the first pusher 700 and the second pusher 800, the motor 410 is in the low-loading state, the circuit module 300 transmits a signal to the motor 410, and the motor stops driving the gear assembly 420.

Moreover, in the process of pushing the object I along the first direction A1 by the first pusher 700, the interference between the first pusher 700 and the object I in the recess 110 may occur and the first pusher 700 cannot keep moving. At this time, the motor 410 cannot drive the first pusher 700 to move, and it is in a high-loading state. Therefore, when the detecting unit of the circuit module 300 detects that the motor 410 is in a high-loading state, the circuit module 300 transmits a signal to the motor 410 and the motor 410 drives the first pusher 700 to move along a second direction (opposite to the first direction A1) to the position shown in FIG. 4, and then it moves along the first direction A1 again. If the interference still exists after the first pusher 700 alternately moves along the first direction A1 and second direction several times, the circuit module 300 transmits a signal to the motor 410 and the motor 410 stops operating.

In the process of moving the object I, the user can continually interact with the animals by the video/audio transceiver 200. For example, the user can make noise from the speaker to attract the animals, or observe the animals chasing the thrown object I by the camera.

Figure 8:
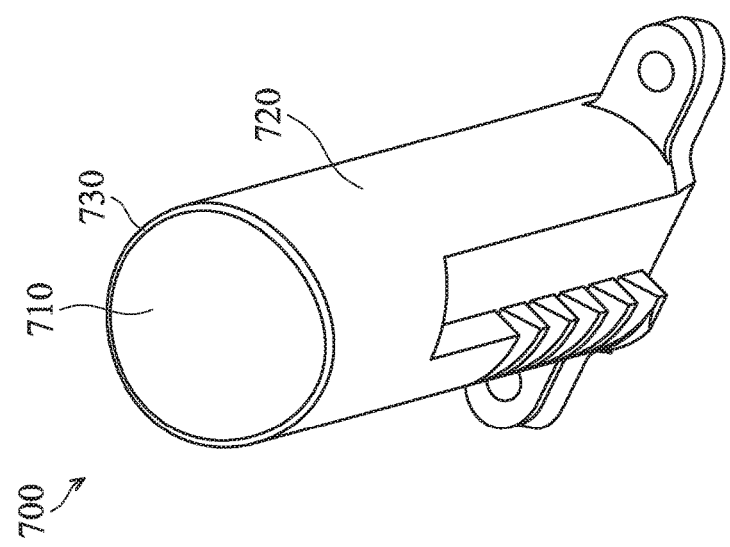
FIG. 8 is a schematic diagram of the first pusher according to an embodiment of the invention.

It should be noted that, an angle between the guiding slot 111 and the inner wall of the first communicating member 500 is about 20°-80° (30° for example), and the first communicating port P1 between the first and second communicating members 500 and 600 is not covered by the second pusher 800 when the second pusher 800 moves between the first position and the second position (FIGS. 7 and 8). Thus, the interference between the second pusher 800 and the object I can be prevented when the object I drops from the first communicating member 500.

Referring to FIGS. 3B and 8, the number of objects I pushed out from the recess 110 is primarily determined by the dimensions of the top surface 710 of the first pusher 700 and the width of the guiding slot 111. A round corner 730 is formed on the top surface 710 and a lateral surface 720 of the first pusher 700, so that the surplus objects I can easily drop, the number of objects I pushed out from the recess 110 can be precisely controlled.

Figure 9:
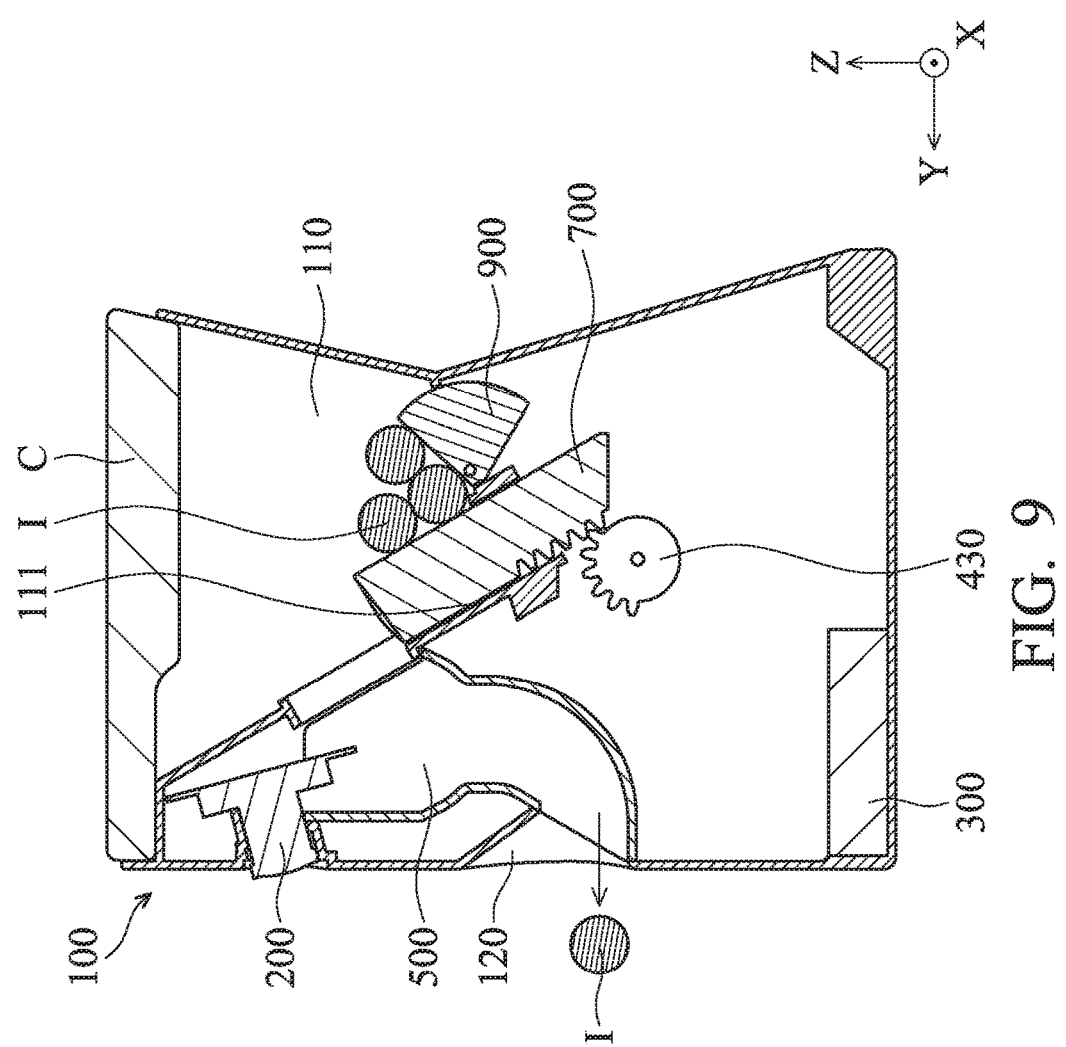
FIG. 9 is a schematic diagram of an interactive device for animals according to another embodiment of the invention.

Referring to FIG. 9, in another embodiment of the invention, the first communicating member 500 is directly connected to the opening 120 of the main body 100. Thus, the object I pushed out from the recess 110 can directly slide out of the main body 100 through the first communicating member 500.

Figure 10A:
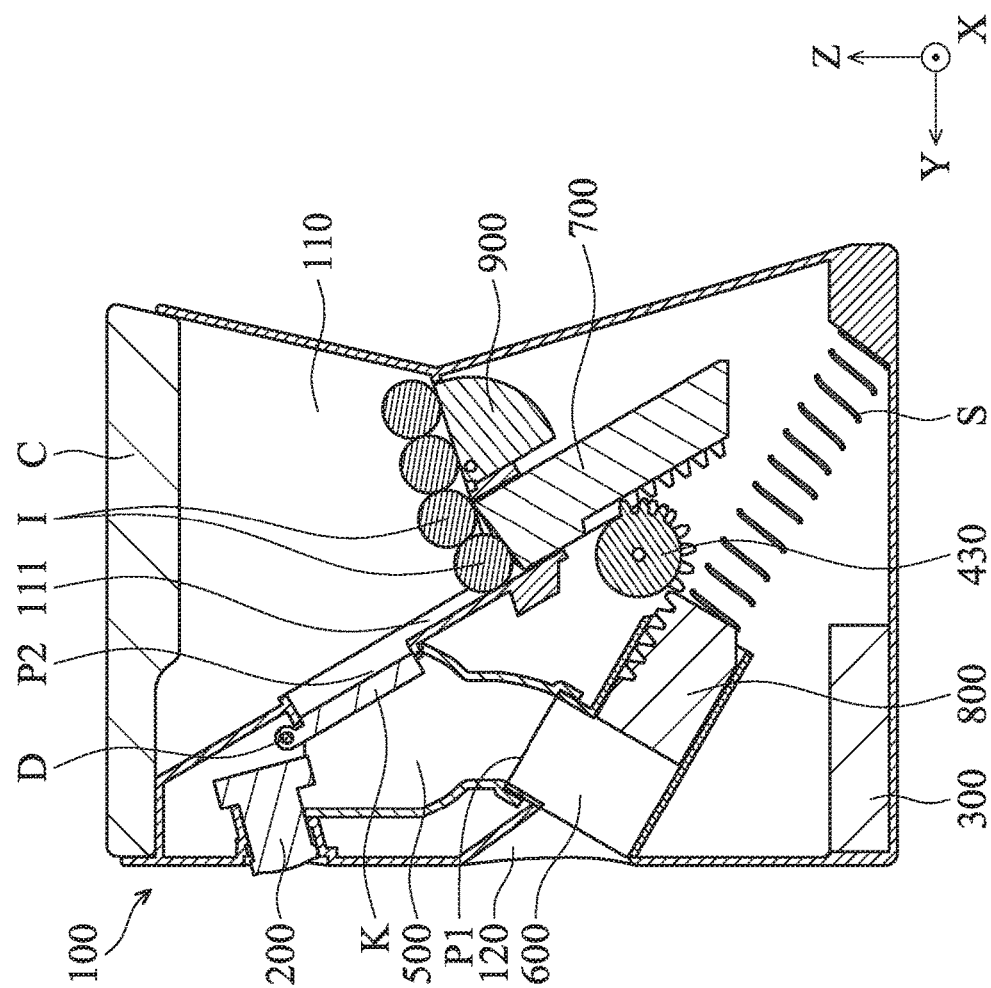
FIGS. 10A and 10B are schematic diagrams of an interactive device for animals according to another embodiment of the invention.
Figure 10B:
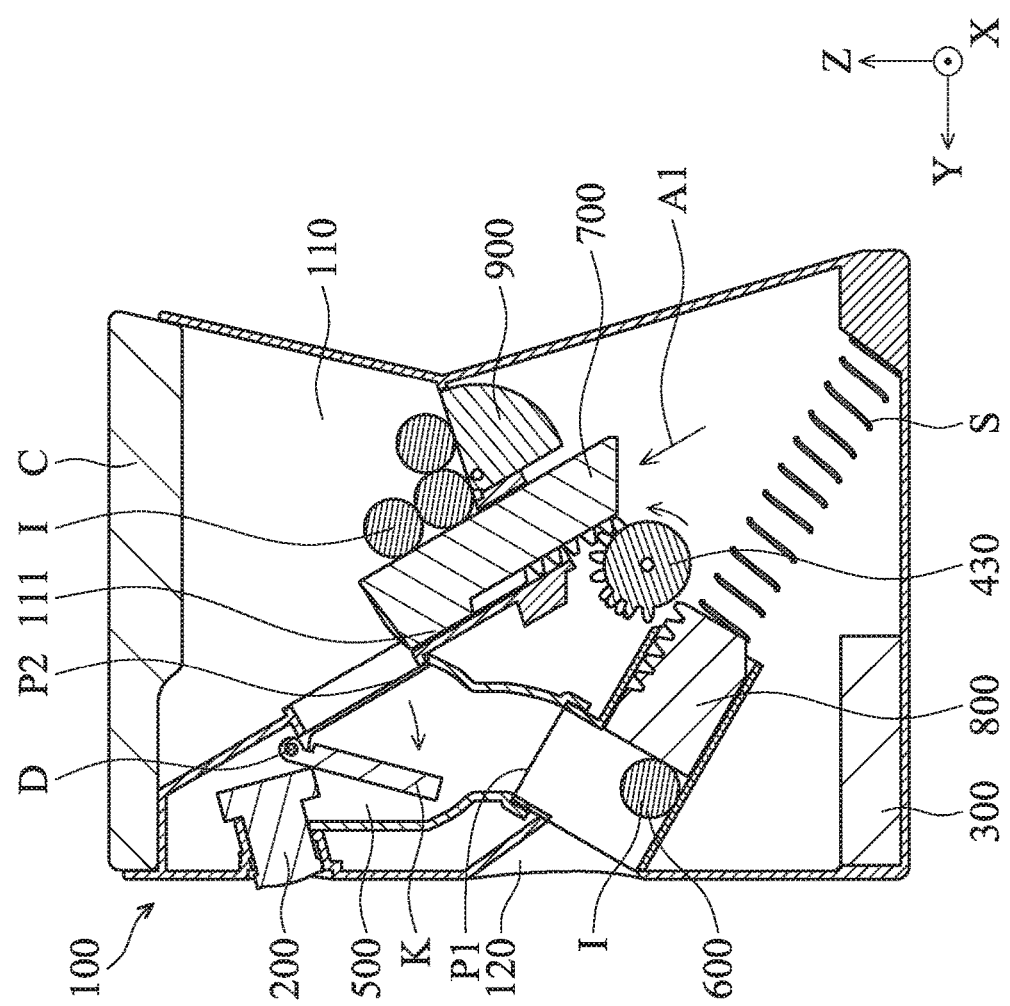

As shown in FIG. 10A, in another embodiment of the invention, the interactive device for animals further comprises a sealer K for sealing a second communicating port P2 between the recess 110 and the first communicating member 500, such that the ingress of insects can be prevented. As shown in FIG. 10B, when the object I is pushed out by the first pusher 700, the sealer K is driven by the driving module 400 and rotates relative to the second communicating port P2, such that the object I can leave the recess 110 and drop into the first communicating member 500.

Furthermore, in some embodiments, the second pusher 800 and the elastic member S can be replaced by an elastic sheet (not shown), the driving module 400 can directly provide a deformation force to deform the elastic sheet. When the deformation force is released and the shape of the elastic sheet is resumed, the object I can be thrown out of the main body 100 through the opening 120 by the elastic sheet.

In summary, an interactive device for animals is provided. The interaction can be created by the video/audio transceiver or the method of throwing the object. Furthermore, because the first pusher pushes the object along the first direction, the number of objects pushed out from the recess can be precisely controlled.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An interactive device for animals, comprising:
   a main body, comprising a recess and an opening;
   a circuit module, disposed on the main body;
   a video/audio transceiver, disposed on the main body and electrically connected to the circuit module;
   a driving module, disposed on the main body and electrically connected to the circuit module, comprising:
      a motor;
      a gear assembly, connected to the motor; and
      an intermittent gear, connected to the gear assembly;
   a first pusher, movably disposed in the recess and connected to the driving module;
   a first communicating member, connected to the recess and the opening;
   a second communicating member, connected to the first communicating member and the opening;
   a second pusher for pushing the object out of the main body through the opening, movably disposed in the second communicating member and connected to the driving module; and
   an elastic member, connected to the main body and the second pusher, wherein when the driving module drives the first pusher to move along a first direction and protrude from an inner wall of the recess, the first pusher pushes an object in the recess into the first communicating member, and the object leaves the main body through the opening, wherein the first pusher and the second pusher respectively comprise a gear rack, when the motor drives the gear assembly and the intermittent gear to rotate, the intermittent gear intermittently and repeatedly engages with the first pusher and the second pusher.

2. The interactive device for animals as claimed in claim 1, wherein the interactive device for animals further comprises a first communicating port, formed between the first communicating member and the second communicating member, wherein the first communicating port is not covered by the second pusher.

3. The interactive device for animals as claimed in claim 1, wherein the circuit module comprises a detecting unit for detecting the loading of the driving module, wherein when the detecting unit detects that the driving module is in a low-loading state, the driving module stops driving the gear assembly.

4. The interactive device for animals as claimed in claim 1, wherein the circuit module comprises a detecting unit for detecting the loading of the driving module, wherein when the detecting unit detects that the driving module is in a high-loading state, the driving module drives the first pusher to move along a second direction, wherein the second direction is opposite to the first direction.

5. The interactive device for animals as claimed in claim 1, wherein the interactive device for animals further comprises a stirring plate, disposed in the recess and connected to the driving module, wherein the stirring plate is rotatable relative to the main body.

6. The interactive device for animals as claimed in claim 1, wherein a longitudinal slot is formed on an inner surface of the recess, and the driving module drives the first pusher to move along the longitudinal slot and protrude from the inner wall of the recess.

7. An interactive device for animals, comprising:
a main body, comprising a recess and an opening;
a circuit module, disposed on the main body;
a video/audio transceiver, disposed on the main body and electrically connected to the circuit module;
a driving module, disposed on the main body and electrically connected to the circuit module;
a first pusher, movably disposed in the recess and connected to the driving module;
a first communicating member, connected to the recess and the opening; and
a sealer, wherein a second communicating port is formed between the recess and the first communicating member, and the sealer is pivotally connected to the driving module for sealing the second communicating port, wherein when the driving module drives the first pusher to move along a first direction and protrude from an inner wall of the recess, the first pusher pushes an object in the recess into the first communicating member, and the object leaves the main body through the opening.

8. The interactive device for animals as claimed in claim 1, wherein the video/audio transceiver comprises a camera, a microphone, an LED or a speaker.

* * * * *